United States Patent [19]

Aitken et al.

[11] 4,253,686

[45] Mar. 3, 1981

[54] PIPE COUPLING USEFUL AT HIGH FLUID PRESSURES

[76] Inventors: W. Sidney Aitken, 9774 Via Zibello Dr.; Russell J. Sarno, 3210 Winona Ave., both of Burbank, Calif. 91504

[21] Appl. No.: 28,819

[22] Filed: Apr. 10, 1979

[51] Int. Cl.³ ............................................. F16L 19/00
[52] U.S. Cl. ................................. 285/249; 285/382.7
[58] Field of Search ............ 285/249, 248, 250, 382.7, 285/343

[56] References Cited

U.S. PATENT DOCUMENTS

| 871,607 | 11/1907 | Montgomery | 285/343 X |
|---|---|---|---|
| 3,428,339 | 2/1969 | Haulik et al. | 285/249 X |
| 3,756,632 | 9/1973 | Riggs et al. | 285/250 |
| 3,784,236 | 1/1974 | Slocum | 285/249 X |
| 3,870,349 | 3/1975 | Oetiker | 285/249 |
| 3,986,731 | 10/1976 | DeHoff | 285/249 X |

FOREIGN PATENT DOCUMENTS

| 36719 | 2/1965 | German Democratic Rep. | 285/343 |
|---|---|---|---|
| 1157868 | 7/1969 | United Kingdom | 285/382.7 |
| 1162344 | 8/1969 | United Kingdom | 285/343 |
| 1268765 | 3/1972 | United Kingdom | 285/249 |

Primary Examiner—Thomas F. Callaghan
Attorney, Agent, or Firm—Donald D. Mon

[57] ABSTRACT

A pipe coupling particularly adapted for use with plastic pipe carrying fluid at high pressure has a body section from which there extend in the axial direction, two concentric sleeve sections with a concentric annular space between them. The end of a pipe to be coupled is fitted over the internal sleeve and an annular wedge is placed in the annular space between the pipe and the external section. A nut having an annular sleeve is threaded to the external section so that the annular nut sleeve enters the annular space and engages the wedge. Torquing of the nut urges the wedge along a camming surface into tight engagement with the pipe, thus deforming it to prevent its withdrawal from the coupling. The tightness of the coupling is enhanced by variation of the diameter of the internal sleeve in the vicinity of the wedge and by ridges on the internal sleeve into which material of the pipe is forced by the wedge to flow.

1 Claim, 3 Drawing Figures

PIPE COUPLING USEFUL AT HIGH FLUID PRESSURES

This invention relates to a pipe coupling capable of withstanding high fluid pressures.

Pipe couplings for joining sections of pipe are well-known. It is also known that when fluid in the pipe system is under relatively high pressure there is a tendency for a pipe section held in the coupling to separate from the coupling. This tendency toward separation under high pressure is often a problem particularly where a pipe section being held at the coupling has no positive means of connection to the coupling, such as threads. In the case of a length of pipe which has been cut to be fitted to a coupling there is ordinarily no positive attaching means on this pipe section, and the ability of the coupling to prevent withdrawal of such a pipe section from the coupling under high pressure can be a problem.

An object of the present invention is to provide a pipe coupling device which enables such a pipe section to be firmly held within the coupling even under extreme fluid pressure within the pipe.

The invention is carried out by provision of a coupling device comprising a body section containing an internal passageway through it forming a conduit for fluid flow through it along the axis of the passageway. From the body section there extends an internal sleeve section whose internal surface forms a continuation of the wall of the passageway at the body section, and there also extends an external sleeve section of greater diameter than the internal sleeve and co-axial with the internal sleeve and the axis of the passageway. The external sleeve is dimensioned relative to the internal sleeve so that there is formed an annular space between the internal sleeve and the external sleeve into which the end of a pipe section to be held in the coupling is inserted. The annular space is constructed large enough to accommodate not only the end of the pipe section which fits closely to the external surface of the interior sleeve, but also accommodates an inner sleeve of a nut having an exterior envelope threadable to the exterior surface of the exterior sleeve. The internal surface of the exterior sleeve contains an oblique or camming section such as is provided by a conical shape so that an annular wedge placed within the annular space between the exterior surface of the pipe and the interior surface of the exterior sleeve, can be pushed by the nut sleeve toward the body section when the nut is torqued. This action causes forward camming surface of the wedge to cam on the camming section of the exterior sleeve, thereby compressing the wall of the pipe which has been placed in the coupling firmly against the exterior surface of the internal sleeve. Thus, the wedge holds the pipe section securely in the coupling. A suitable attaching means such as a threaded nipple section at the opposite side of the body from the sleeves will serve to hold a pipe section which is to be joined to that side of the coupling so that a continuous fluid flow through the coupling is permitted from the one pipe section to the other. The pipe section which is attached to the threaded section may be provided with threads or a suitable threaded nut or the like which will withstand the fluid pressure, as is well understood.

There are a number of features which it is preferred to use to enhance the firmness of the attachment of the pipe section which is held within the annular space. One such feature is the provision of annular ridges on the exterior surface of the internal sleeve into which material of the joined pipe is caused to flow by pressure from the wedge. Another feature is the enlargement of the exterior diameter of the inner sleeve from an intermediate position on the sleeve toward both ends of the sleeve, which results in the deformation of the end of the pipe section to a larger diameter between the wedge and the body section than the diameter at the region of the camming parts of the wedge and outer sleeve. This deformation inhibits withdrawal of the pipe section under high fluid pressure.

The coupling according to this invention is well adapted for use with plastic pipe. Accordingly the coupling will ordinarily be made of a plastic material.

The foregoing and other features of the invention will be better understood from the following detailed description and the accompanying drawings, in which.

Figure 2:
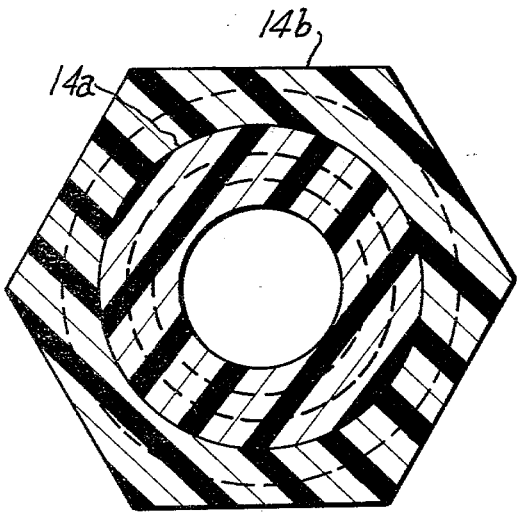
FIG. 2 is a cross-section view taken at line 2—2 in FIG. 1.

In the drawing there is shown a coupling 10 extending along an axis 11, at one end of which there is a threaded hollow nipple section 12 coaxial with axis 11, for attachment in a well-known manner to a pipe or conduit (not shown) by means of the threads, The coupling is adapted to grip another pipe or conduit 13 whose end is unthreaded, such as for example a length of plastic pipe. The coupling 10 comprises a main body section 14 with an internal cylindrical wall 15 coaxial with axis 11, communicating with the passageway through the nipple section providing a passageway for fluid flow. The exterior surface of the body section is hexagonal as best seen in FIG. 2, so that it can be gripped by a wrench. An internal annular sleeve section 16 extends axially from the body section 14 in the direction opposite from the nipple section 12 and this sleeve section 16 has an internal cylindrical surface 15a of the same diameter as the internal cylindrical surface 15 of the body section; hence the surfaces 15 and 15a together constitute a coaxial cylinder. An external annular sleeve section 17 also extends from the body section 14 coaxially in the same direction as the internal sleeve 16. The external sleeve 17 surrounds most of the internal sleeve 16 and is of sufficiently greater diameter than that of sleeve 16 so that there is left an annular space 18 between the exterior surface 19 of sleeve 16 and the interior surface 20 of sleeve 17.

For a purpose to be described hereinafter the internal surface 20 is uniquely configured. Thus, a first of its sections 20a located adjacent the body section 14 is cylindrical. A second section 20b located at the opposite side of section 20a from the body section 14 has a conical shape with its smallest diameter at its end which meets the end of section 20a, and its largest diameter at a position 21 remote from section 20a. A third section 20c extends as a cylinder in the axial direction from the largest diameter end of section 20b to its end 22 furthest from the main body section 14.

The exterior surface 19 of the internal sleeve 16 is generally cylindrical but is uniquely modified for a particular purpose to be described hereinafter. Thus, throughout the greater portion of its axial length it is provided with a number of circular ridges 23 circumferentially around the exterior surface 19 and spaced equidistantly apart. Each of the ridges 23 is formed with a conical surface 23a whose diameter expands in the direction toward the body section 14 to the circular peak of the ridge, and the opposite surface 23b of the ridge lies in a plane which is substantially perpendicular to the axis 11 so that its trough 23c is of lesser diameter than that of the peak of the ridge 23. Preferably the diameters of the peaks and troughs decrease slightly in the direction toward the body section 14 relative to the diameters of the peaks and troughs at the region more remote from the body section 14. Furthermore, at the region 24 of the exterior surface 19 between the body section 14 and the ridge nearest the body section, the diameter of this exterior surface increases somewhat from the diameter of the trough of the ridge 23 which is closest to the body 14.

Figure 1:
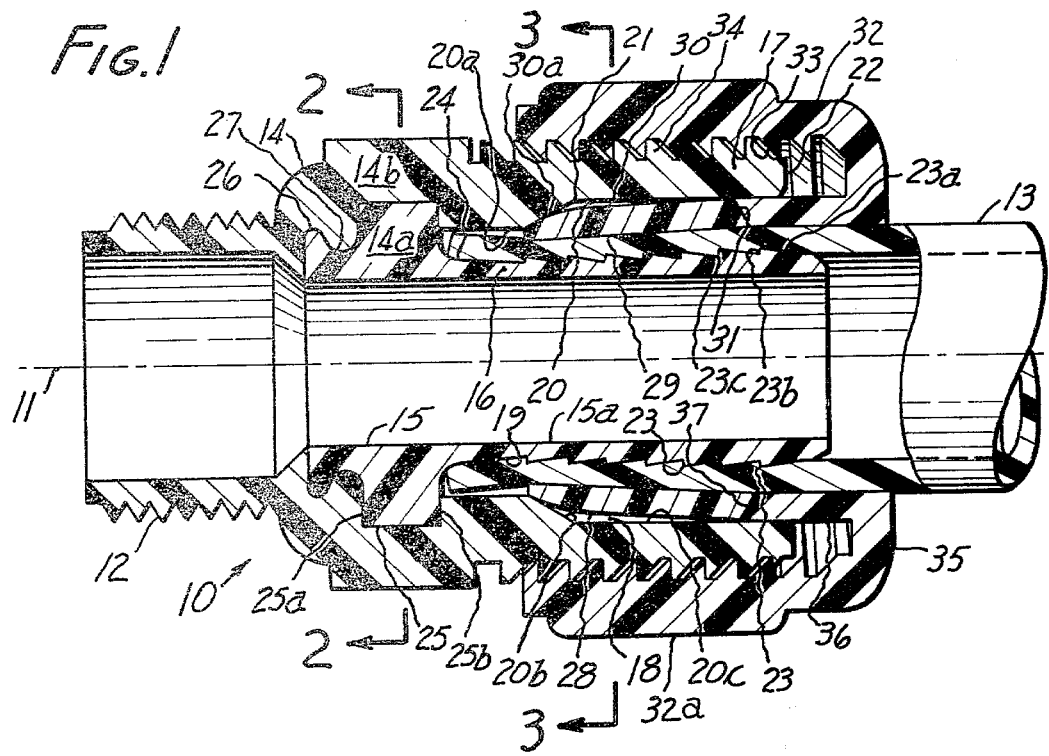
FIG. 1 is a cross-section view of a pipe coupling according to this invention, which illustrates the gripping of a section of pipe within the coupling.
Figure 3:
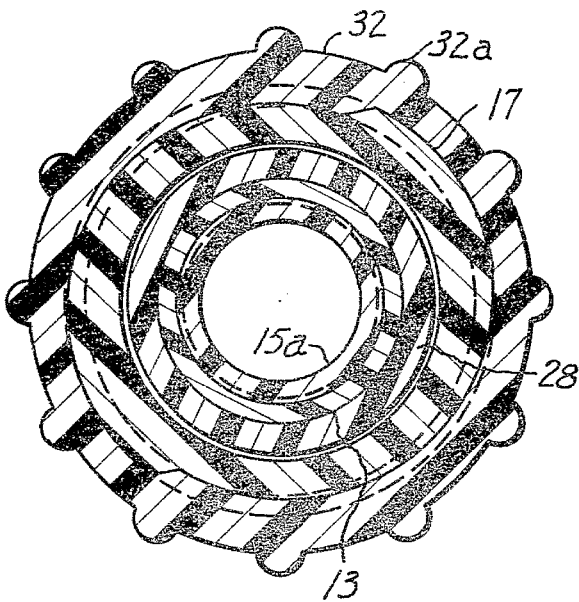
FIG. 3 is a cross-section view taken at line 3—3 in FIG. 1.

It is contemplated that the material of the coupling will usually be of a molded plastic, such as for example polyvinyl chloride, particularly when the pipe 13 to be gripped is of polyvinyl chloride. To facilitate the molding process the portion of the coupling 10 comprising the body section 14, the attachment nipple section 12 and the axially extending sleeve sections 16 and 17 can conveniently be made in two parts as shown in FIG. 1. The preferred way of doing this is to mold first the part comprising the internal sleeve 16 and the portion 14a of body section 14. The portion 14a is preferably provided with an irregular configuration as shown in FIG. 1. Thus, it comprises a collar portion 25 of greater diameter than that of sleeve 16, provided with side walls 25a and 25b in parallel planes perpendicular to the axis 11, and an enlargement 26 leaving a trough 27 between the collar 14 and the enlargement 26. The part comprising the outer portion 14b of body section 14, the attachment nippled section 12 and the external sleeve 17 can then be molded around the body portion 14a so that the external configuration of body portion 14a firmly secures and bonds to the body portion 14b, resulting in a unitary fluid conduit member comprising the body 14, the attachment nipple 12, the internal sleeve 16 and the external sleeve 17.

The diameter of the internal sleeve 16 is selected so that it accommodates the size of pipe 13 to be gripped around it. The pipe 13, ordinarily of a plastic material such as polyvinyl chloride, will have an internal diameter which can be slid snugly over the ridges 23 from the end of the coupling opposite the nipple section 12, the fit being especially snug at the ridges most remote from the body section 14. The pipe 13 will thus be slid over the sleeve 16 until the end of this pipe rides along the exterior surface of the section 24 of sleeve 16, at which position the end of the pipe will be slightly expanded due to the expansion of the diameter of section 24 toward the body 14. Thus, the end of the pipe will abut the position of body portion 14a which is expanding to form the wall 25b.

For the purpose of securing the pipe section in this position there is provided a wedge member 28 having a unique configuration for cooperating with the internal and external sleeves to fix securely the end of the pipe 13 within the coupling. The wedge 28 is in the form of an annular collar which fits within the annular space 18 over the exterior surface of the pipe 13 and within the interior surface 20 of the exterior sleeve 17 and engages the interior surface 20. The interior surface 29 of the wedge is slightly conical with its smaller diameter end toward the body section 14 so that it conforms substantially with the somewhat conical slope of the ridges 23. The outer surface 30 of the wedge is substantially parallel to the internal surface 29 except that it curves inwardly toward the axis at its end 30a where it engages the conical surface 20b of the exterior sleeve. The opposite end surface 31 of the wedge is conical.

For the purpose of urging the wedge in the direction toward the body 14 and securing it there, there is provided a nut 32 having external splines 32a for torquing, and internal threads 33 which engage external threads 34 of the external sleeve 17. The end 35 of the nut, which is positioned beyond the ends of the internal and external sleeves remote from body 14, is provided with an inner annular sleeve 36 of the proper dimension to slide over the exterior of pipe 13 and within the internal surface of the exterior sleeve 17. The end 37 of sleeve 36 is made conical with a conical angle which conforms with that of the end 31 of the wedge 28 so that when the nut is threaded to the exterior sleeve the end 37 of the nut sleeve urges the wedge toward the body section 14 as the nut is torqued. In doing this the curved surface 30a of the wedge slides on conical surface 20b which thus acts as a camming surface for the wedge. This camming action tends to deform the end portion 30a of the wedge to a somewhat smaller diameter so that the internal surface 29 of the wedge applies radially inward pressure against the exterior surface of the end portion of pipe 13 which is within the coupling, thereby causing the material of the pipe 13 to flow into the troughs 23c of the ridges 23. Because of the somewhat conical shape of the external surface at region 24 of the internal sleeve, the end of the pipe 13 located between the wedge and the body portion 14a is deformed to a conical tilt compared with the somewhat conical tilt in the opposite direction, of the part of the pipe 13 more remote from the body portion 14a. The effect of this deformation of the pipe end is to securely wedge the portion of the pipe within the coupling so that the pipe cannot be withdrawn even under very high fluid pressure when the nut is properly torqued so that the nut sleeve exerts pressure against the wedge. The parts of the pipe which have flowed into the troughs 23c are held against withdrawal from the coupling by the surfaces 23b of the ridges, and furthermore the deformed end of the pipe between the wedge and the body 14a at region 24 of the internal sleeve is held by the wedge against withdrawal.

It will be recognized that by this invention there is provided an effective coupling device which can readily be molded from plastic material and is useful for securely joining two pipe sections, ordinarily of plastic material, even under high fluid pressure, and permits free flow of fluid through the coupling from one pipe section to the other.

This invention is not to be limited by the embodiment shown in the drawings and described in the description, which is given by way of example and not of limitation, but only in accordance with the scope of the appended claims.

I claim:
1. Pipe coupling means for gripping a section of pipe to be inserted therein, comprising:
 (a) a fluid conduit member having an internal passageway extending along an axis for fluid flow therethrough;
 (b) a deformable annular wedge member coaxial with said conduit member, said wedge member not being connected to any other part of the coupling means;
(c) a nut threadable to said conduit member and coaxial therewith;
said conduit member comprising:
(1) a body section,
(2) an internal annular sleeve section coaxial with said axis, extending in one direction axially from said body section, circumferential ridges being formed on the external surface of said internal sleeve section, troughs being formed between adjacent ones of said ridges,
(3) an external annular sleeve section coaxial with said axis, extending axially in said one direction from said body section and enveloping said internal sleeve section with a first annular space between said internal and external sleeve sections; and
(4) means extending axially from said body section in the direction opposite said one direction, for attachment to a first section of pipe, said sections and means being integrally joined to one another;
said nut having an opening through it to permit passage of the pipe section therethrough, and having an outer annular envelope and an inner annular sleeve with a second annular space therebetween, the external surface of said external sleeve engaging threads of said nut and the internal surface of said external sleeve being in sliding engagement with said nut sleeve, and having a tapered camming surface at a region between the nut sleeve and the body section;
said annular wedge member having an internal diameter allowing it to slide closely over the exterior surface of a pipe section whose internal surface is fitted over the external surface of said internal sleeve, and having a camming surface which engages the camming section of said external sleeve and having at its end remote from said camming surface, a surface engaged by said nut sleeve, and having at its end opposite said remote end, a surface in engagement with the exterior surface of the pipe section, the external diameter of said internal sleeve section increasing in both axial directions from its diameter at the position where said surface of said wedge member is in engagement with the exterior surface of the pipe section;
whereby when the nut is torqued on the external sleeve while a pipe section is inserted into said first annular space and between the wedge and the internal annular sleeve section, the nut sleeve engages said remote end surface of the wedge and urges the camming surface of the wedge to slide on the camming surface of the exterior sleeve, causing the wedge to deflect inwardly so as to compress the pipe section against the exterior surface of the internal sleeve.

* * * * *